July 23, 1968   C. H. MASON, JR   3,393,645
COUNTING AND STACKING APPARATUS FOR TORTILLAS OR THE LIKE
Filed Aug. 7, 1967   2 Sheets-Sheet 1
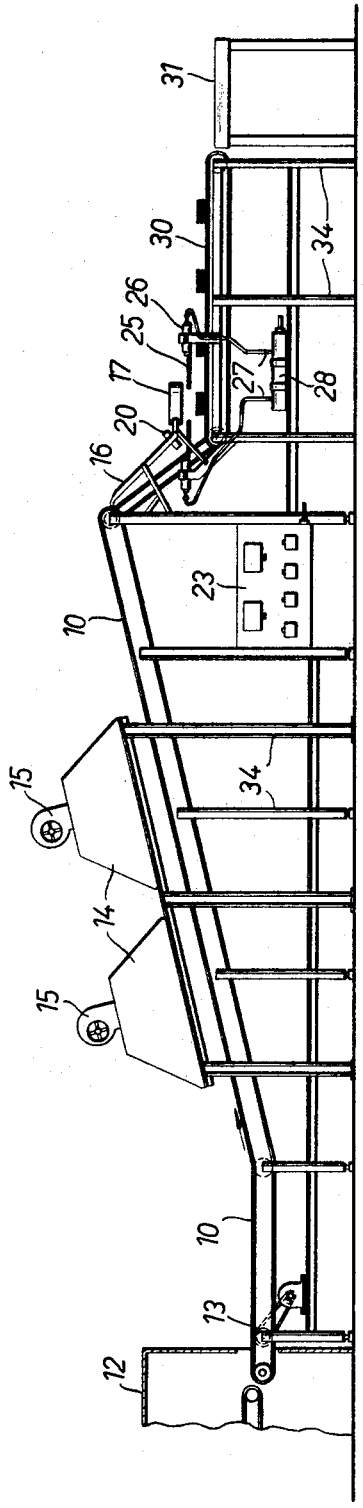
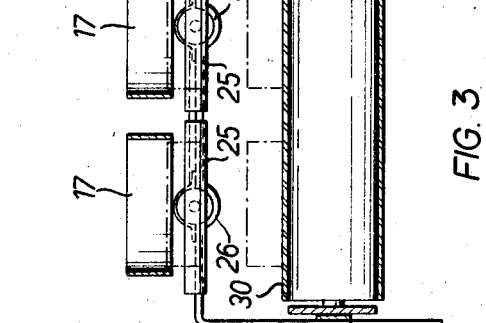
FIG. 3
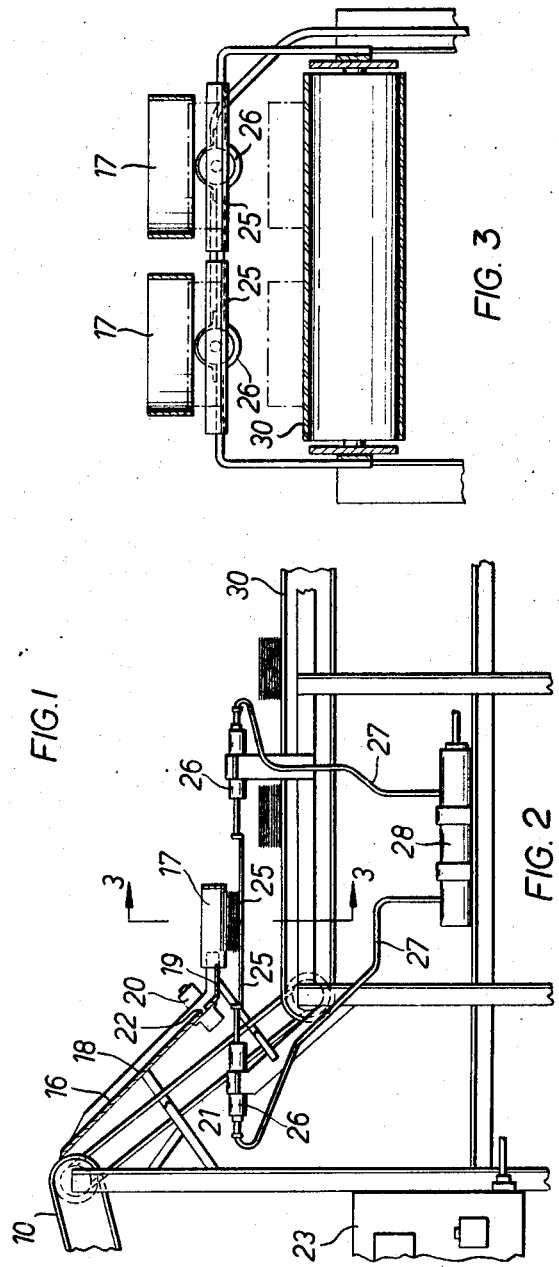
FIG. 2
INVENTOR:
CARY H. MASON, JR.
BY John D. Graham
ATTORNEY July 23, 1968   C. H. MASON, JR   3,393,645
COUNTING AND STACKING APPARATUS FOR TORTILLAS OR THE LIKE
Filed Aug. 7, 1967   2 Sheets-Sheet 2
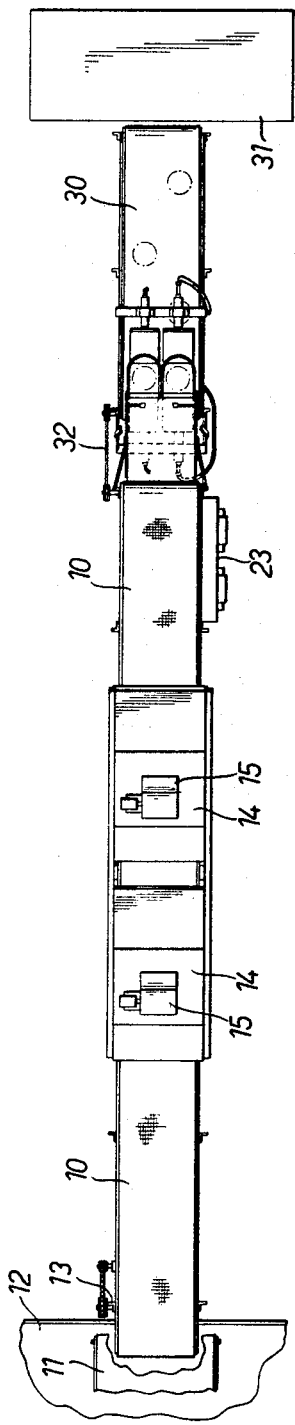
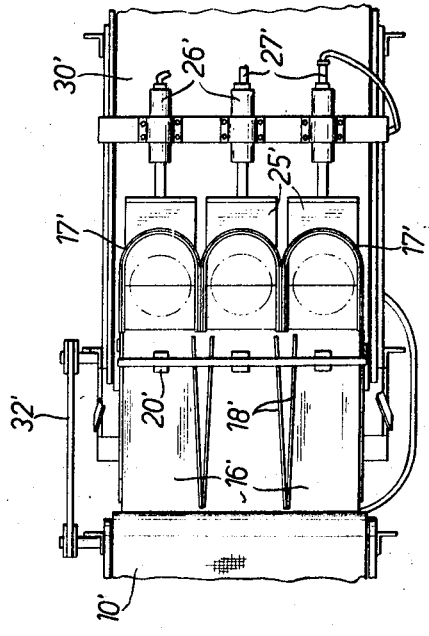
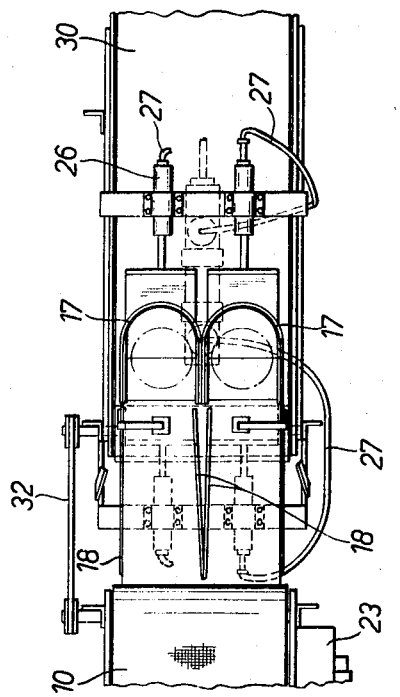
INVENTOR:
CARY H. MASON, JR.
BY  *John D. Graham*
ATTORNEY

United States Patent Office 3,393,645
Patented July 23, 1968

3,393,645
COUNTING AND STACKING APPARATUS FOR TORTILLAS OR THE LIKE
Cary H. Mason, Jr., 2610 Tisinger Ave., Dallas, Tex. 75228
Filed Aug. 7, 1967, Ser. No. 658,818
8 Claims. (Cl. 107—45)

ABSTRACT OF THE DISCLOSURE

This application discloses apparatus for automatically stacking tortillas or the like as delivered from a baking oven to provide even stacks of a desired number as would be packaged for consumer use. The apparatus counts and stacks multiple rows independently of one another whereby variation in spacing of the rows as delivered from the oven is accommodate. The tortillas may be delivered from the oven to the counting and stacking mechanism by a conveyor passing through a cooling station.

---

Tortillas are consumed in the Southwestern region of the country much in the manner of bread, these being packaged in bags of perhaps 15 or 20 and sold in grocery stores. Tortillas are very thin, flat baked goods composed essentially of corn meal and water. After baking and while still hot, these goods are very limp and thus difficult to handle by mechanical means due to the ease of folding and wrinkling. High volume ovens have been commercially available which are able to produce many thousands of tortillas per hour at very low cost; but, heretofore, handling of the tortillas delivered from the oven on a conveyor has been entirely by hand. Labor has been needed to gather stacks of the tortillas from the conveyor output of the oven in proper numbers for packaging. Due to the high cost of labor at present, this operation has become prohibitively expensive in view of the low price for which this commodity must be sold. Accordingly, it has become necessary to mechanize this portion of the production operation.

It is therefore the principal object of this invention to provide apparatus for mechanically and automatically receiving the output of a tortilla baking oven and counting and stacking the tortillas into individual stacks suitable for packaging. Another object is to provide such counting and stacking apparatus which is adapted for handling tortillas in the form as delivered hot from a baking oven. An additional object is to provide such counting and stacking operation in apparatus which is relatively simple and inexpensive in construction whereby mass production may be achieved at relatively low cost.

In accordance with this invention, apparatus is provided for stacking tortillas or like products by employing a conveyor arrangement for receiving two or more rows of tortillas from a baking oven and moving the tortillas along a substantial length for cooling purposes before delivering them to a counter and stacking mechanism. The cooling function may be aided by a blower and hood above the conveyor. A plurality of chutes are positioned at the end of the conveyor, one chute for each row of tortillas, with the chutes being slanted downward to deliver the tortillas to a stacking position. Guides and/or collars may be used along with the chutes to align and position the tortillas, and the chute preferably flattens out at its lower end to provide a flat trajectory for the tortillas delivered to the stack. These features being primarily for the purpose of avoiding folding or wrinkling of the tortillas. Beneath the stacking position a moveable plate or plates hold the tortillas until the desired number has been reached. A counting mechanism responsive to the tortillas passing down the chutes or into the stack registers the number in the stack and causes the plate arrangement to be operated at the proper number. A photocell type counter may be used, or a microswitch device is suitable. The plates may be operated by pistons driven by air pressure in cylinders. It is important that the counter, stacker and release mechanisms be separate for each row since the spacing of tortillas in the rows may vary.

The novel features believed characteristic of the invention are set forth in the appended claims. The invention itself, however, as well as further objects and advantages thereof, will best be understood by reference to the following detailed description of particular embodiments, when read in conjunction with the accompanying drawings, wherein:

FIGURE 1 is an elevation view of the entire conveyor apparatus including cooling, counting and stacking means for tortillas;

FIGURE 2 is an enlarged detailed view, partly in section, of the counting and stacking portion of the apparatus of FIGURE 1;

FIGURE 3 is an enlarged detailed elevation view in section of the apparatus of FIGURES 1 and 2, taken along the line 3—3 in FIGURE 2;

FIGURE 4 is a plan view of the entire apparatus of FIGURE 1;

FIGURE 5 is an enlarged detailed plan view of the counting and stacking apparatus portion of the apparatus of FIGURES 1-4; and FIGURE 6 is a detailed plan view of the counting and stacking portion as in FIGURE 5 for an embodiment including three stacking mechanisms rather than two.

With reference now to FIGURE 1 of the drawings, the apparatus of this invention includes a conveyor 10 for receiving baked tortillas from a conveyor 11 in an oven 12. The conveyor 10 moves the rows of baked tortillas to the right to the cooling, counting and stacking mechanism. The oven 12 would ordinarily be of high capacity type, producing two rows of tortillas at perhaps 500 dozen per hour or 250 dozen per row per hour. Thus, tortillas are being delivered to the conveyor 10 by the oven conveyor 11 at the rate of almost one per second in each row, and since tortillas are ordinarily about 6⅝ inch in diameter for baking, the conveyor 10 must move at perhaps ten to twelve inches per second to maintain proper spacing. The conveyor 10 moves slightly faster than the conveyor 11 to insure proper pickup of the tortillas without folding. The conveyor 10 is of a wire mesh construction rather than being a solid belt so that cooling is facilitated and sticking is avoided. The path of the conveyor 10 is defined by suitable rollers, but it is understood that the drive mechanism for the conveyor 10 is a toothed wheel or gear 13 which pushes the top portion of the conveyor 10 rather than pulling. This permits the path to be deflected upward without the belt being pulled away from the desired path. The toothed wheel 13 is driven by a suitable motor. The conveyor 10 rises up a slight incline as seen, this being merely for the purpose of raising the level from that of the oven conveyor to a suitable height for the counting and stacking operation.

The tortillas on the conveyor 10 pass under a cooling arrangement including a pair of hoods 14 and blowers 15. The hoods 14 may contain baffle arrangements to direct the flow of air evenly over the tortillas on the conveyor 10. The hoods may be large enough to cover the entire distance of the inclined portion of the conveyor 10, or of course a single hood and blower arrangement may be devised. In some cases, the cooler arrangement may not be necessary if the environment of the factory, or the length of the conveyor 10, produces sufficient cooling, as may be the case in the winter season or in an air conditioned factory. Cooling is ordinarily needed to prevent sticking of the tortillas to one another upon stacking.

Upon reaching the uppermost end of the incline of the conveyor 10, the tortillas are deposited into a counting and stacking mechanism. This mechanism includes a chute 16 for each row of tortillas leaving the conveyor 10, along with a collar 17 for each row. The chutes 16 may be defined by a flat stainless steel sheet which has upright portions 18 welded thereto for defining the paths of each row of tortillas sliding down the chute. Upon leaving the oven and being deposited on the conveyor 10, the rows may not be precisely aligned, the positions of the successive tortillas varying considerably off the intended center line of each row. Thus, the chutes 16, along with upright portions 18, serve the purpose of aligning the tortillas and delivering them into the stacking position. In the path down the chute 16 and into the collar, the tortillas pass over a generally flat portion 19 of the chute, this portion functioning to flatten out the trajectory of the tortillas so they will land upon or float down upon the stack in an almost exactly horizontal position, avoiding the possibility of folding or overlapping. At the lower end of the chute, the tortillas pass through a counting mechanism 20.

The purpose of the counting mechanism 20 is to detect the number of tortillas which have traversed the chute for each row so that the stacking mechanism may be operated when the desired number of tortillas reach the stacking position. There is a separate counter for each row or each chute since the spacing of the tortillas may be different in the two rows, or a different number may reach the stacking position for each row in a given length of time. The counting mechanism 20 may comprise a photoelectric arrangement including a light source 21 positioned below the chute aligned with a small aperture 22 in the chute. The counter 20 would thus include a photocell positioned above the chute responsive to light passing through the hole 22. When a tortilla intercepts the light path, the photocell would detect this fact and produce an electrical signal which is applied by separate electrical conductors, not shown, extending from the photocells to a control panel 23.

The control panel 23 includes two separate counting circuits which may comprise stepping switches which are multiple contact rotary switches of conventional form or may comprise conventional solid state shift registers or the like. As each tortilla passes the counting mechanisms 20 for each chute, the light path between photocell and light source would be interrupted, providing an electrical pulse to the stepping relay corresponding to this chute, so the appropriate register would advance one unit. Upon reaching a count of a dozen, 15, or any other number which may be desired for a stack for consumer purposes, the stepping relay or other register for this row or this chute applies an electrical signal, as would occur when the stepping switch reached the 12th contact, to an appropriate solenoid valve to cause operation of an air-operated arrangement for dropping this completed stack and permitting the beginning of a new stack, as will be described.

The tortillas, upon sliding down the chutes 16 and over the flat portions 19 of the chutes, are propelled horizontally a distance such that they just barely touch the collars 17 but do not collide therewith at a velocity which would cause folding. The chutes 17 are shaped to guide the tortillas downwardly and align them with one another to produce an even stack. The bottom of the chute 17 has a diameter only slightly greater than the average maximum diameter of the baked tortilla. The tortillas fall down onto a pair of moveable plates 25 which function to hold the stacks until the proper number has been reached, the plates 25 being connected by shafts to pistons in air cylinders 26. Each of the air cylinders 26 is connected separately by lines 27 to control valves 28 so that the sets of plates 25 for each of the two stacks may be operated independently. The valves 28 are operated by electrical controls from the control panel 23. The cylinders 26 may be of various types of construction, one example being wherein the pistons are held against the inner ends of the cylinders by air pressure from the conduits 27 so that the plates 25 are touching or in the position indicated in FIGURE 2. When the valve 28 is operated, that is when the register reaches the count of twelve or other set number, the air pressure within the lines 27 and cylinders 26 will be vented to atmosphere and the pistons will spring back rapidly to the release position seen in FIGURE 1. The spring action may be provided by conventional means biasing the pistons toward the outer ends of the cylinders or toward the release position.

When the proper number of tortillas has passed through the counting mechanism 20 and the desired number registered on the counter in the control panel 23, the valve 28 will be operated, causing compressed air applied to the cylinders 26 for the appropriate row to be vented. The plates 25 will be quickly withdrawn to the position seen in FIGURE 1, and the stack of tortillas will drop down onto a conveyor 30. The plates 25 are then caused to quickly snap back to the position seen in FIGURE 2 so that the next tortilla in this row, following very closely behind the laast tortilla in the previous stack, will fall upon the plates 25 as desired. In one embodiment, a twelve position stepping relay may be used as the counter register, the relay stepping one position each time a tortilla passes through the counter 20 and generates an electrical pulse from the photocell. When the twelfth position is reached, an electrical potential is applied to the solenoid valve 28 to cause it to vent the compressed air and allow the pistons and plates 25 to move to the release position. To simplify the circuitry, the solenoid valve may remain energized until the next tortilla passes through the counter 20 which would advance the relay to the No. 1 position which would de-energize the solenoid valve and allow compressed air to again be applied to the cylinders and drive the pistons back to the hold position. This would occur fast enough that the plates 25 would be in place under the collar before the tortilla reached the plates. Preferably, however, the mechanism operates to return the plates 25 to center or hold before the next tortilla goes through the counter 20 so there will be no possibility of the next tortilla being caught between the plates. The mechanism operating the plates 25 should complete an operating cycle in a period of perhaps 7/10 or 9/10 second to prevent the next following tortilla from falling into the plates while they are open or while closing.

The conveyor 30 moves the stacks of tortillas to the right at a rate considerably slower than the movement along the conveyor 10 so that the stacks of tortillas may be manually bagged or packaged and placed on a receiver 31 which may be another conveyor or a work table. Of course, the conveyor 30 may deliver the stacks of tortillas into an automatic packaging mechanism. The conveyor 30 may be driven from a roller at the end of the conveyor 10 by a pulley and belt arrangement 32, the sizes of the pulleys being such that the desired speed of the conveyor 30 relative to the conveyor 10 is obtained.

The entire apparatus including the conveyor 10, the cooling mechanism 14, the counting and stacking mechanism 16, 17, 20, 25, the conveyor 30, the control panel 23, etc., are all mounted on appropriate support members 34 as illustrated, these of course, forming no critical part of the invention.

As illustrated in FIGURE 6 of the drawings, it is noted that the apparatus may be constructed to count and stack three rows of tortillas rather than two. It is, of course, understood that any number of rows may be similarly accommodated utilizing the principles of the invention. The three counting and stacking units seen in FIGURE 6 would be separately controlled just as the two units of FIGURES 1–5. Primed reference numerals are used in FIGURE 6 to denote the same parts indicated in FIGURES 1-5.

While the invention has been described with reference to particular embodiments, it is understood, of course, that this description is not to be construed in a limiting sense. Various modifications of the disclosed embodiments, as well as other embodiments of the invention will be apparent to persons skilled in the art upon reference to this specification. It is therefore contemplated that the appended claims will cover any such modifications or embodiments as fall within the true scope of the invention.

What is claimed is:

1. Apparatus for stacking tortillas or like products comprising conveyor means adapted for receiving a plurality of rows of such products from a baking oven and moving such products along a substantial length of the conveyor means for cooling, a plurality of chutes positioned at the end of said conveyor means, each chute being generally aligned with one of the rows of said products, means defining an aperture for each row, the chutes slanting downward whereby the products slide down the chutes to the apertures, guide means positioned around the apertures to align the products, movable plate means positioned below each of said apertures to receive such products in an aligned stack, counting means adjacent said chutes for detecting each of such products sliding down to the apertures, and means for rapidly moving said plate means from beneath the stack to permit the stack to fall to receiving means when a selected number of such products is counted, the plate means being separately operable for each row.

2. Apparatus according to claim 1 wherein the plate means each comprise a pair of plates which are removable between a holding position adjacent one another beneath the aperture and a release position on opposite sides of the aperture, the means for moving the plate means being effective to cycle the pair of plates from the holding position to the release position and back in less than the time spacing between such products in the row.

3. Apparatus according to claim 2 wherein the pairs of plates are separately operable by air operated cylinders, pressurized air being applied to the cylinders by control valves operated in response to the counting means.

4. Apparatus according to claim 3 wherein the chutes include generally flat portions at the lower end thereof to flatten the trajectory of the products reaching the stacks, and wherein the receiving means is a second conveyor means for moving the stacks of products from beneath the apertures.

5. Apparatus according to claim 1 wherein cooling blower means is positioned above said conveyor means to cool said products.

6. Apparatus according to claim 1 wherein said receiving means is a second conveyor means for moving the stacks of products from beneath the apertures.

7. Apparatus according to claim 1 wherein the chutes include generally flat portions at the lower end thereof to flatten the trajectory of the products reaching the stacks.

8. Apparatus according to claim 1 wherein the counting means includes photocells and light sources, the products intercepting the light paths between the photocells and light sources as the products pass down the chutes.

References Cited

UNITED STATES PATENTS

| | | | |
|---|---|---|---|
| 1,801,997 | 4/1931 | Boettcher | 107—45 |
| 2,519,491 | 8/1950 | Monaco | 107—45 X |
| 2,833,426 | 5/1958 | Bosken | 198—35 X |
| 3,061,066 | 10/1962 | Casino | 198—30 |

WALTER A. SCHEEL, *Primary Examiner.*

J. SHEA, *Assistant Examiner.*